US008787930B2

(12) United States Patent
Ahmad et al.

(10) Patent No.: US 8,787,930 B2
(45) Date of Patent: Jul. 22, 2014

(54) METHOD AND APPARATUS FOR ESTIMATING POSITION OF ACCESS POINT IN WI-FI SYSTEM

(75) Inventors: Uzair Ahmad, Daejeon-si (KR); Wan Sik Choi, Daejeon-si (KR); Sang Joon Park, Daejeon-si (KR); Young Su Cho, Seoul (KR); Do Hyun Kim, Daejeon-si (KR); Dong Kyoo Kim, Yeong-gun (KR); Sung Jo Yun, Daejeon-si (KR); Myung In Ji, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 400 days.

(21) Appl. No.: 13/286,716

(22) Filed: Nov. 1, 2011

(65) Prior Publication Data

US 2012/0122475 A1    May 17, 2012

(30) Foreign Application Priority Data

Nov. 15, 2010   (KR) ......................... 10-2010-0113101

(51) Int. Cl.
*H04W 24/00*    (2009.01)
(52) U.S. Cl.
USPC ...................................... 455/456.1; 455/41.2
(58) Field of Classification Search
CPC .................................. H04W 4/02; H04W 4/04
USPC ............................................. 455/41.2, 456.1
See application file for complete search history.

(56) References Cited

U.S. PATENT DOCUMENTS

| 7,683,835 B2 * | 3/2010 | Sharma .......................... 342/458 |
| 8,242,960 B2 * | 8/2012 | Alizadeh-Shabdiz ........ 342/463 |
| 8,284,103 B2 * | 10/2012 | Alizadeh-Shabdiz ........ 342/458 |
| 8,355,739 B1 * | 1/2013 | Chhabra ..................... 455/456.3 |
| 8,462,745 B2 * | 6/2013 | Alizadeh-Shabdiz ........ 370/338 |
| 8,564,481 B2 * | 10/2013 | Alizadeh-Shabdiz ........ 342/463 |
| 8,638,256 B2 * | 1/2014 | Alizadeh-Shabdiz et al. ......................... 342/357.31 |
| 8,638,725 B2 * | 1/2014 | Alizadeh-Shabdiz ........ 370/328 |
| 2002/0045455 A1 * | 4/2002 | Spratt ........................... 455/456 |
| 2006/0095349 A1 | 5/2006 | Morgan et al. |

FOREIGN PATENT DOCUMENTS

| JP | 2010-507963 | 3/2010 |
| KR | 10-2006-0070493 | 6/2006 |
| KR | 10-2008-0074971 | 8/2008 |
| KR | 10-2009-0132634 | 12/2009 |
| WO | WO 2008/051124 A1 | 5/2008 |

OTHER PUBLICATIONS

Korean Notice of Allowance mailed Apr. 23, 2014 in corresponding Korean Application No. 10-2010-0113101.

* cited by examiner

*Primary Examiner* — Amancio Gonzalez
(74) *Attorney, Agent, or Firm* — Staas & Halsey LLP (57) ABSTRACT

A method and apparatus for estimating a position of an access point (AP) includes (a) measuring a strength of a signal, transmitted by the AP, at three or more measurement points (MPs), (b) selecting an imaginary attenuation factor, (c) calculating a range between the AP and each of the MPs on the basis of the imaginary attenuation factor and a strength of a signal measured at the MP, (d) calculating an intersecting point of ranging circles in each of which a position of the MP is a center and the range between the MP and the AP is a radius, (e) calculating a best intersecting point from among a plurality of the intersecting points obtained by repeating the steps (c) and (d) while changing the imaginary attenuation factor, and (f) estimating the best intersecting point as the position of the AP.

14 Claims, 9 Drawing Sheets

◇1 ◇2 ◇3 ◇4 Measurement Points
[A] Wifi Access Point

METHOD AND APPARATUS FOR ESTIMATING POSITION OF ACCESS POINT IN WI-FI SYSTEM

CROSS-REFERENCE TO RELATED APPLICATIONS

This application claims the benefit of priority of Korean Patent application No. 10-2010-0113101 filed on Nov. 15, 2010, which is incorporated by reference in their entirety herein.

BACKGROUND OF THE INVENTION

1. Field of the Invention

The present invention relates to a Wi-Fi system and, more particularly, to a method and apparatus for estimating a position of an access point (AP) in a Wi-Fi system.

2. Related Art

A widely known position measurement technique is a satellite-based system, such as a global positioning system (GPS). The GPS and similar systems employ a flying time-based range mechanism in order to accurately indicate the position of a receiver at a certain point on the earth. However, in the satellite-based system, the receiver is required to maintain the lines of sight from at least four satellites. Accordingly, the GPS is not useful in an indoor environment where most people spend time.

A variety of techniques specific to indoor environments have been developed using various kinds of signal sources, such as cell tower, TV broadcasting station, FM radio, UWB, and RFID. The specific systems require custom-made hardware and sometimes do not apply to the general public.

Recently, with the spread of Internet access based on Wi-Fi (IEEE 802.11a, b, and g standards), the number of Wi-Fi APs in urban areas is sharply increasing. This results from a smart application which requires a user to be in an on-line state anywhere. Accordingly, Wi-Fi signals for measuring positions are also actively used.

A Wi-Fi position measurement system may be divided into two kinds (that is, a coarse accuracy system and a fine accuracy system) according to the accuracy of the subject. The coarse accuracy system provides position information within a range of several tens or several hundreds of meters and suitably applies to outdoor position-based applications. The coarse accuracy system may include, for example, PlaceLab by Intel Corp. or Skyhook.

The fine accuracy system applies to indoor environments, such as shopping malls. The fine accuracy system provides position information within 10 to 20 meters from an accurate position of a target device. The fine accuracy system may include, for example, Ekahau.

One of the biggest difficulties in the Wi-Fi-based position measurement systems is a site surveying task. In the fine accuracy system, an accurate signal for a target position needs to be measured per square meters. The coarse accuracy system applies to wide areas, such as big cities, rather than specific indoor environments. Accordingly, a signal is not measured per meter. In the systems, private or public Wi-Fi is deployed in the whole city area. When the databases of APs are constructed in the whole city area, the private or public Wi-Fi matches detected APs, searches the databases for the detected APs, and estimates the positions of devices on the basis of AP position information. Next, the estimated positions are downloaded to the target devices whose positions are actually measured. Accordingly, the position of an AP becomes the most important information in such systems.

There is a need for a method and apparatus for accurately measuring the position of an AP.

SUMMARY OF THE INVENTION

The present invention provides a method and apparatus for estimating a position of an AP in a Wi-Fi system.

In an aspect, a method of estimating a position of an access point (AP) in a Wi-Fi system is provided. The method include the steps of (a) measuring a strength of a signal, transmitted by the AP, at three or more measurement points (MPs), (b) selecting an imaginary attenuation factor, (c) calculating a range between the AP and each of the MPs based on the imaginary attenuation factor and a strength of a signal measured at each of the MP, (d) calculating an intersecting point of ranging circles in each of which a position of the MP is a center and the range between the MP and the AP is a radius, (e) calculating a best intersecting point from among a plurality of the intersecting points obtained by repeating the steps (c) and (d) while changing the imaginary attenuation factor, and (f) estimating the best intersecting point as the position of the AP.

The imaginary attenuation factor may be changed at an interval of 0.1 between 2 to 6.

In the step (c), the range between the MP and the AP may be calculated according to Equation $$d_{ai} = d_o 10^{\left(\frac{P_o - RSS_{ai}}{10 \times \alpha}\right)},$$

wherein $d_0$ is a standard distance, $P_0$ is a nominal signal strength of the AP, $\alpha$ is an imaginary attenuation factor, and $RSS_{ai}$ is an average value of the strength of the signal.

In the step (d), a number of the intersecting points of the ranging circles may be 2. The method may further include the step of determining whether a number of intersecting points of the ranging circles is 2 and a change of the strength of the signal is smaller than a specific threshold value. The method may further include the step of changing the strength of the signal by the change, if, as a result of the determination, the number of intersecting points of the ranging circles is not 2 and the change of the strength of the signal is smaller than the specific threshold value.

In the step (f), the position of the AP may be estimated using an iterative Least-Square (LS) algorithm.

In another aspect, an apparatus for estimating a position of an AP in a Wi-Fi system is provided. The apparatus include a Radio Frequency (RF) unit configured to transmit or receive a radio signal, and a processor, coupled to the RF unit, and configured to measure a strength of a signal, transmitted by the AP, at three or more MPs, select an imaginary attenuation factor, calculate a range between the AP and each of the MPs based on the selected imaginary attenuation factor and the strength of the signal measured at each of the MP, calculating an intersecting point of ranging circles in each of which a position of the MP is a center and the range between the MP and the AP is a radius, and estimate a best intersecting point, from among the calculated intersection points, as the position of the AP.

The imaginary attenuation factor may be changed at an interval of 0.1 between 2 to 6.

In the step (d), a number of the intersecting points of the ranging circles may be 2. The method may further include the step of determining whether a number of intersecting points of the ranging circles is 2 and a change of the strength of the signal is smaller than a specific threshold value. The method may further include the step of changing the strength of the signal by the change, if, as a result of the determination, the number of intersecting points of the ranging circles is not 2 and the change of the strength of the signal is smaller than the specific threshold value.

In the step (f), the position of the AP may be estimated using an iterative Least-Square (LS) algorithm.

DESCRIPTION OF EXEMPLARY EMBODIMENTS

Hereinafter, some embodiments of the present invention are described in detail with reference to the accompanying drawings in order for those skilled in the art to be able to readily implement the invention. However, the present invention may be modified in various different ways and are not limited to the following embodiments. In order to clarify a description of the present invention, parts not related to the description are omitted, and the same reference numbers are used throughout the drawings to refer to the same or like parts. Further, a description of parts which can be easily understood by those skilled in the art is omitted.

When it is said that any part "includes (or comprises)" any constituent element, it means that the corresponding part may further include other constituent elements unless otherwise described without excluding other constituent elements.

Position information is one of pieces of the most important information in constructing a smart computing system. Position information may be applied to the tracking navigators, vehicles, human, assets, etc. industrially in various ways. With the development of positioning technology, a new computing paradigm based on position information is made possible. Applications, such as friend and child finding and elderly care, is generalized.

From among the existing position measurement systems, the PlaceLab system has constructed a massive database of APs with the help of hobbyists called "War-Drivers." However, the system does not search for an actual position of an AP. Instead, a position detected by an AP, having a signal of the strongest strength, is used as the position of the AP. Accordingly, large errors occur in the position of the AP, which may lead to errors in estimating the position. In particular, APs may be estimated to be placed at inappropriate places, such as roads or undeveloped areas.

The Skyhook system performs actual measurement at all possible angles near a specific AP, while running all possible roadsides, in order to reduce the above position estimation errors in the AP. In order to measure the position of an AP, the Skyhook system employs an inverse triangulation centroid formula. This system also has the following disadvantages.

1) The monitoring of an AP signal is very limited because measurement is performed from all the sides of a building block. Such measurement in the urban community scale is similar to measurement per square meters in a building block.

Figure 1:
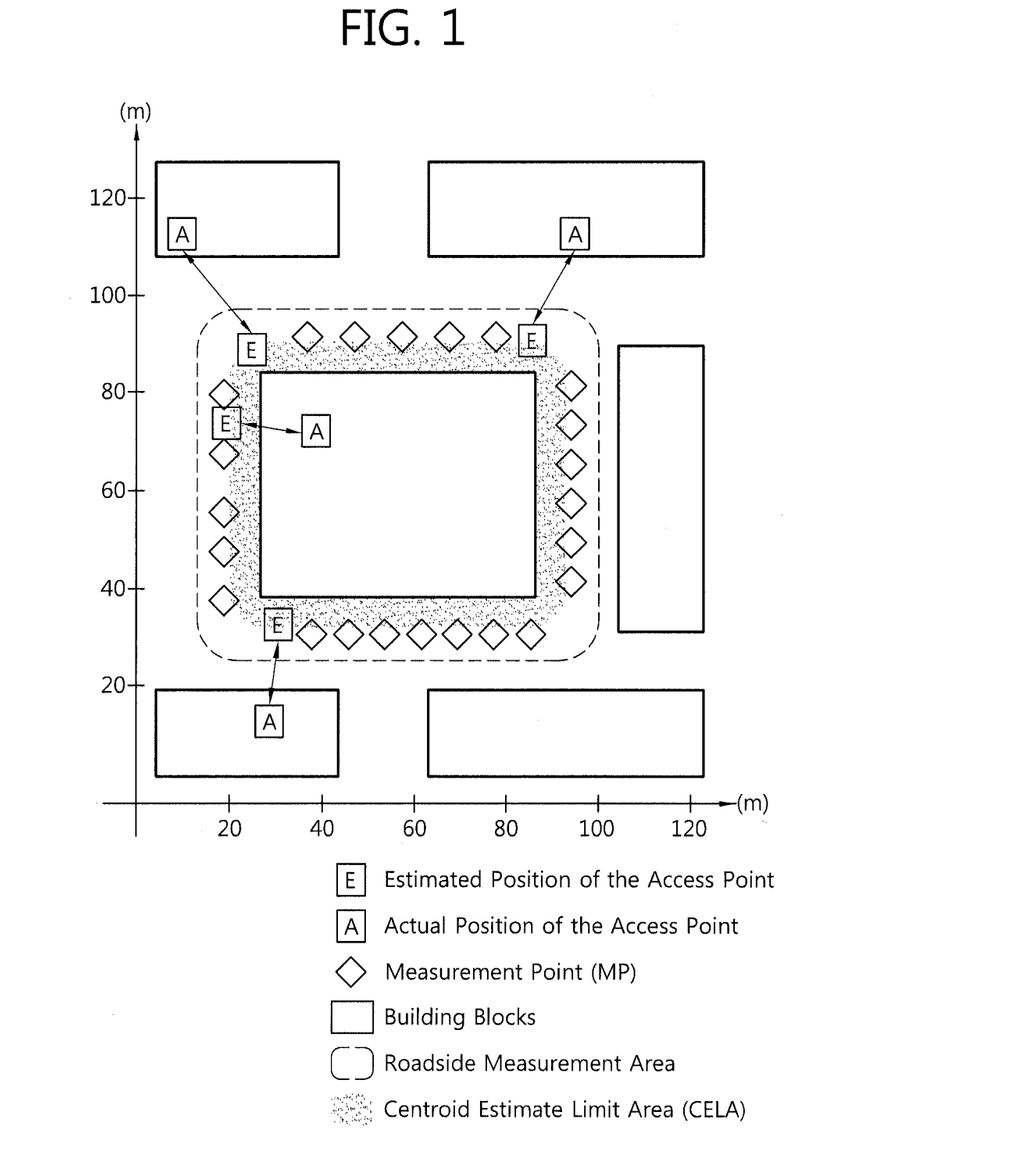
FIGS. 1 and 2 shows an example of an arterial bias phenomenon.
Figure 2:
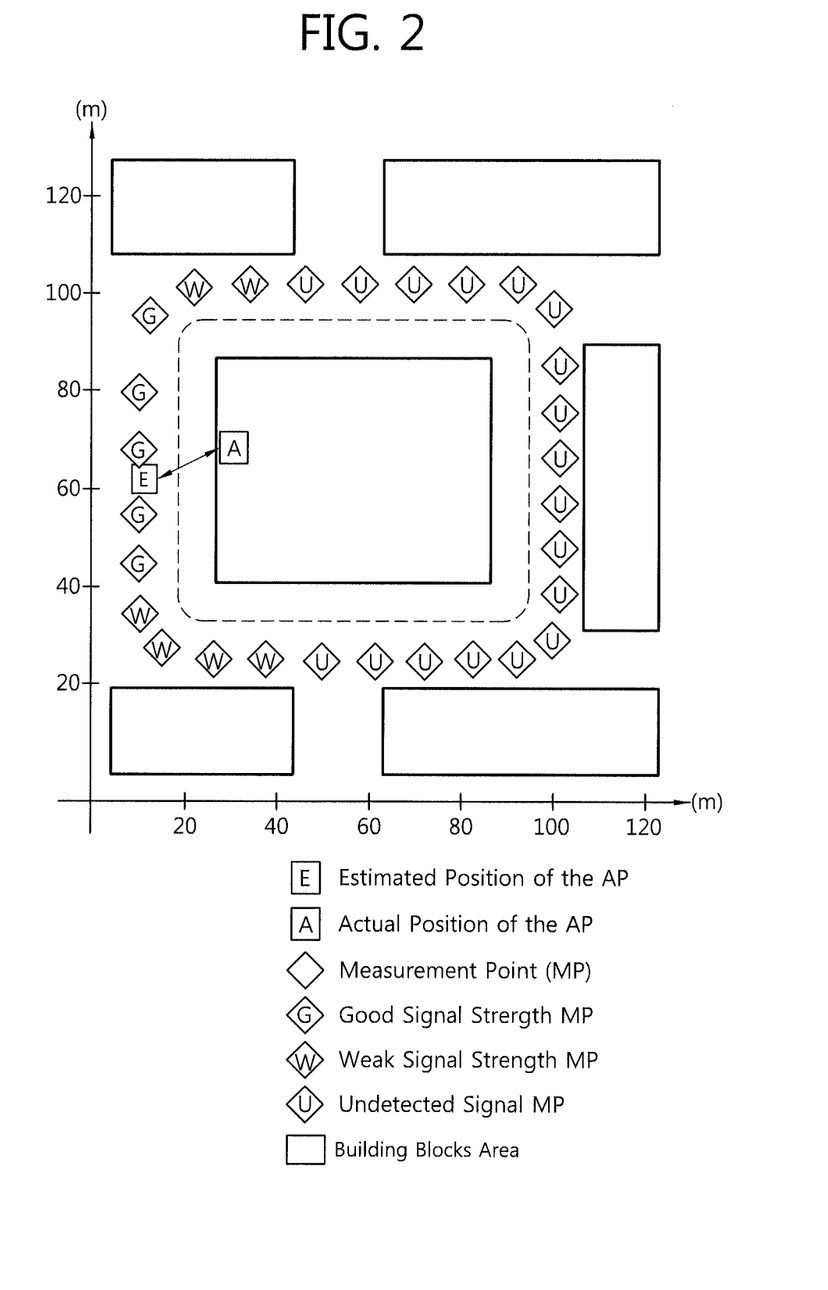

2) If an AP is not monitored from all the sides, a position estimation error called an arterial bias may occur. The arterial bias phenomenon means that the position of an AP is not estimated within a building block, but estimated on the roadside. FIG. 1 shows an example of the arterial bias phenomenon. 3) In general, the size of a building block in the downtown is 100*100 square meters or more. Even when a Wi-Fi signal is measured from all the sides of the building block, the arterial bias phenomenon may occur. This is because the Wi-Fi signal may not be detected on the other side. FIG. 2 shows another example of the arterial bias phenomenon.

Accordingly, there is a need for a method of measuring the position of an AP more accurately.

The present invention relates to a method and system for estimating the position of an AP by measuring the strength of a signal of the AP at a sparsely located measurement point (MP). More particularly, the present invention provides an iterative multi-lateration method of measuring the factors of a radio signal propagation model by using a minimal set of the strengths of a reference beacon signal measured at an MP on the roadside, a method of estimating the position of a reference beacon disposed within a building block adjacent to an MP, and an integrated system for developing the position database of reference beacons. The process of estimating the position of an AP includes MP planning, measurement, iterative estimation of the factors of a propagation environment, and the estimation of a final position of an AR The integrated system performs the above-described processes.

According to an embodiment of the present invention, an AP may be installed at an unknown position within a target building block. That is, the AP may become an example of a reference beacon according to the present invention. The strength of a signal of each AP is measured at four or more MPs outside the building block. The horizontal and vertical coordinates of the MP may be determined with the help of a digital map or a GPS receiver. The positions of the MPs are selected on a target building side having a relatively open space as compared with an indoor environment. The strength of a signal may be measured in two steps. A Wi-Fi AP probing signal is generated by a system mounted on a handheld device. Each Wi-Fi AP within a range responds to the Wi-Fi AP probing signal. The identity of each Wi-Fi AP and the strength of the signal are calculated and recorded along with the coordinates of the MPs. An AP position estimation module obtains the position of the AP on the basis of the measured information.

According to another embodiment of the present invention, the integrated system for estimating the position of an AP may be installed in a handheld device configured to measure the strength of a signal, estimate a position, and perform display. Information about the coordinates of the AP and MPs, identification (ID), or an MAC address may be immediately sent to a server. A display module may draw the MPs and the AP on a digital map displayed in the screen of the handheld device.

According to yet another embodiment of the present invention, the handheld device may be mounted on a vehicle running along MPs. Information about the coordinates of an AP and the MPs, identification (ID), or an MAC address may be sent to a server.

The reference beacon database may be used to determine the position of a target device. An apparatus capable of employing Wi-Fi together with the database may find its position by searching the database for the positions of detected APs and calculating the positions of the APs using various weighted centroid methods. Furthermore, the system for developing the reference beacon database may consist of integrated hardware and software elements for performing a development process.

Figure 3:
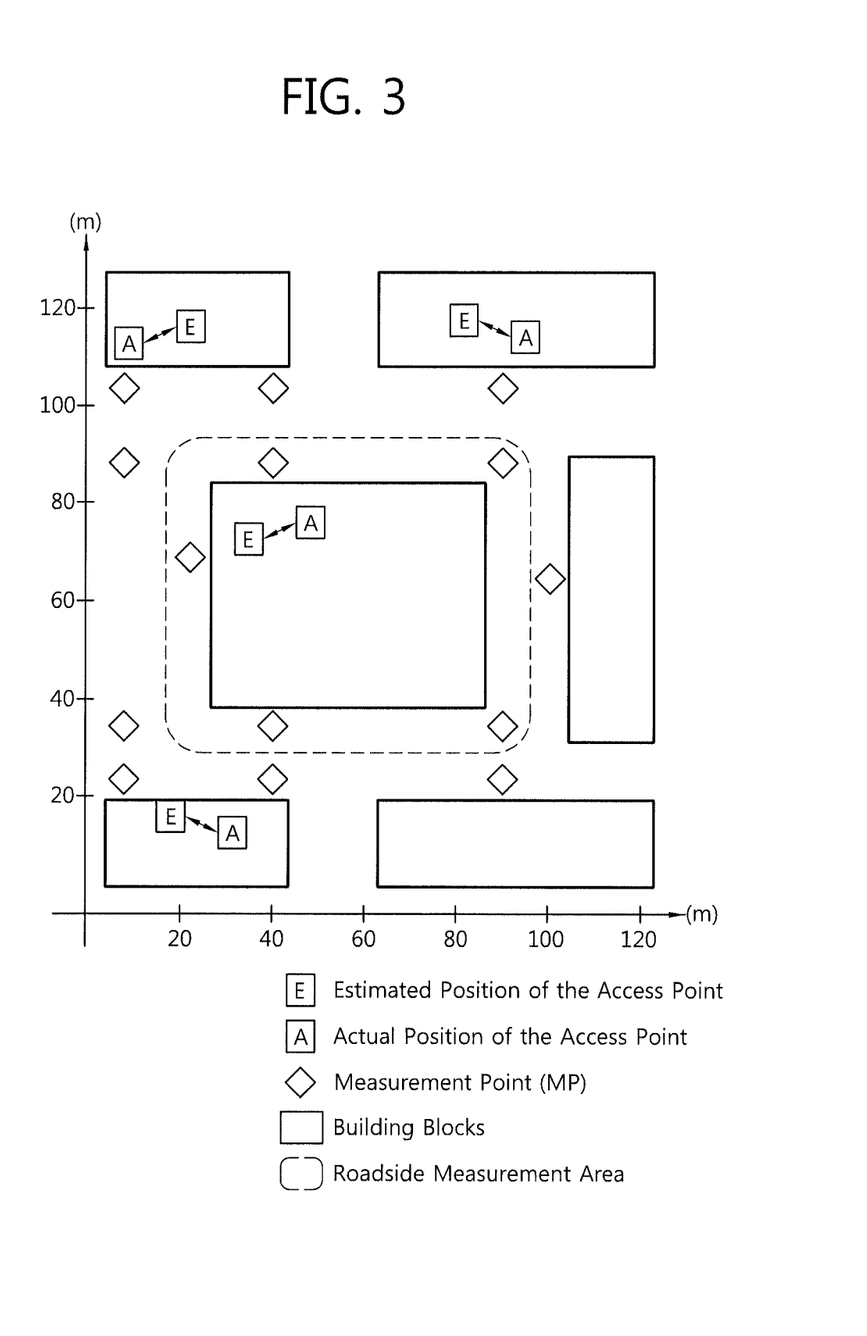
FIG. 3 shows an example in which the positions of APs disposed within building blocks are estimated according to a suggested method of estimating the positions of APs.

FIG. 3 shows an example in which the positions of APs disposed within building blocks are estimated according to the suggested method of estimating the positions of APs.

The requirements of an MP are first described. The present invention may be applied when an MP satisfies the following requirements.

1) Pseudo Line of Sight (PLOS)

An MP is placed relatively in an open space as compared with an internal environment from which the signal of the AP is transmitted. This environment is called a PLOS. The concept of the PLOS does not mean that the AP is not seen in any way on the roadside, but means that the surroundings of the MP have a relatively open space as compared with the indoor environment.

2) Non-alignment

MPs are not aligned in that the MPs do not have the same x or y coordinates.

A received signal strength (RSS) is described below.

A specific MP measures its received signal strength RSS by a specific number of times. Furthermore, the average value of all the received signal strengths RSS measured for a specific AP $AP_a$ may be calculated at the specific MP $MP_i$, and it may be represented by a received signal strength $RSS_{ai}$. The reason why the average received signal strength RSS is measured is to reduce a shift in the measurement resulting from the cause of temporary environments or an inaccurate measurement apparatus. The received signal strength $RSS_{ai}$ is used to calculate the range between the MP $MP_i$ and the $AP_a$.

Equation 1 represents the range between the MP $MP_i$, and the $AP_a$ in a Cartesian coordinate system in terms of physical space.

$$d_{ai} = \sqrt{(MP_{ix}-AP_{ax})^2+(MP_{iy}-AP_{ay})^2}$$ [Equation 1]

wherein $MP_{ix}$ indicates x coordinates of the MP $MP_i$, and $MP_{iy}$ indicates y coordinates of the MP $MP_i$. $AP_{ax}$ indicates x coordinates of the AP $AP_a$, and $AP_{ay}$ indicates y coordinates of the AP $AP_a$.

Equation 2 represents the range between the MP $MP_i$ and the AP $AP_a$ by using the strength of a signal in the Cartesian coordinate system.

$$d_{ai} = d_o 10^{\left(\frac{P_o-RSS_{ai}}{10 \times \alpha}\right)}$$ [Equation 2]

where $P_0$ indicates a nominal signal strength of the AP $AP_a$. $\alpha$ indicates a signal power attenuation factor. $P_0$ indicates the reception sensitivity of a handheld device. The transmission power of an AP may be changed according to different manufacturing specifications. The nominal signal strength $P_0$ may be experimentally calculated by measuring a received signal strength RSS at a place distant from the AP by a standard distance. The standard distance may be any distance and may be, particularly, 1 m.

The position of the AP may be estimated according to the multi-lateration method. The multi-lateration method is described below.

Figure 4:
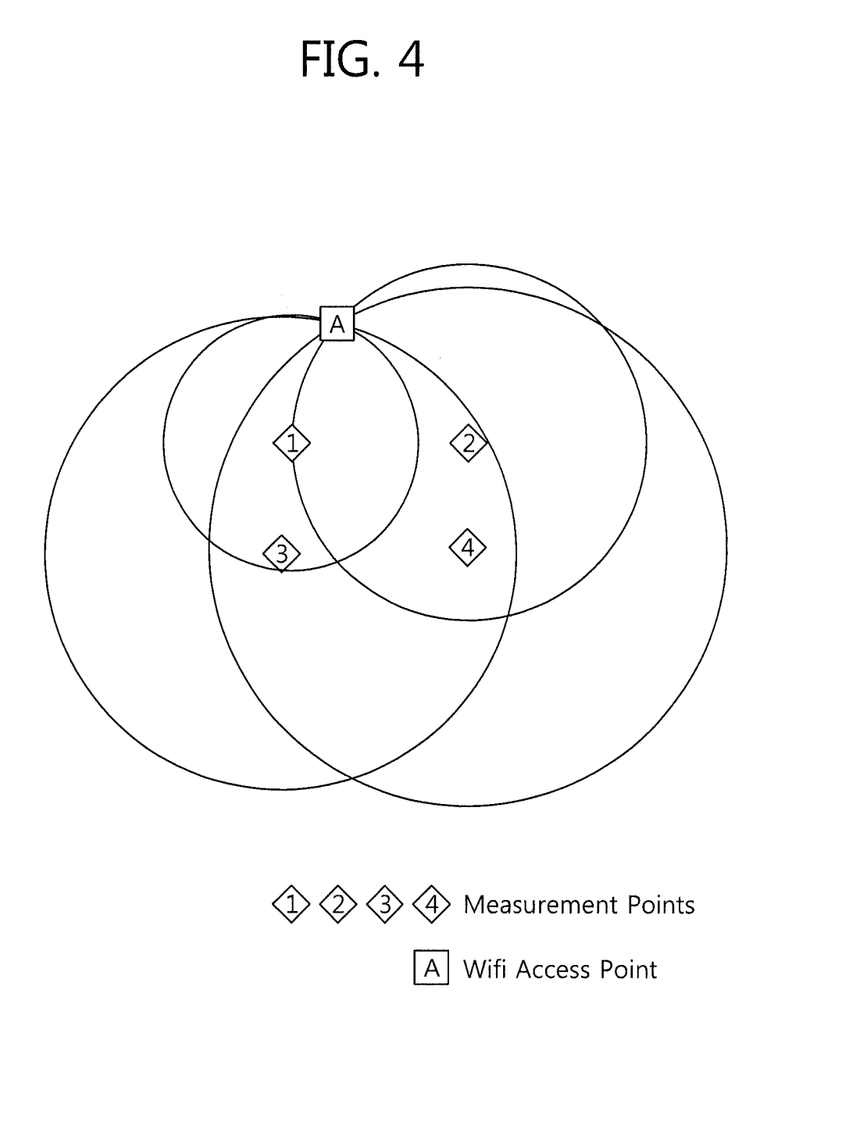
FIG. 4 shows an example of a method of estimating the position of an AP according to the multi-lateration method.

FIG. 4 shows an example of a method of estimating the position of an AP according to the multi-lateration method.

Assuming that the signal power attenuation factor $\alpha$ and the reception sensitivity $P_0$ of the specific AP $AP_a$ are known, the received signal strength $RSS_{ai}$ at the specific MP $MP_i$ may be used to calculate the range between the AP $AP_a$ and the MP $MP_i$ using Equation 2. In case where the range between the AP $AP_a$ and the MP $MP_i$ is sufficiently given, the position of the AP $AP_a$ may be estimated according to the multi-lateration method. The range between the AP $AP_a$ and the MP $MP_i$ needs to be given three or more.

Referring to FIG. 4, four MPs receive signals from an AP and measures a received signal strength RSS on the basis of the received signals. The range between the AP and each of the MPs is calculated using the measured received signal strengths RSS and Equation 2. Furthermore, a ranging circle in which the position of each MP is the center and the range between the corresponding MP and the AP is a radius may be drawn. The range between each MP and the AP has been calculated in the state in which the reception sensitivity $P_0$ and the signal power attenuation factor $\alpha$ are known. Accordingly, intersecting points of the ranging circles meet at the position of the AP from which the signal is generated. That is, the intersecting point of the ranging circles may be estimated as the position of the AP.

In accordance with the multi-lateration method, the signal power attenuation factor $\alpha$ plays a very important role in measuring an accurate range between each MP and the AP. An actual signal power attenuation factor $\alpha$ depends on various factors pertinent to propagation environments.

Figure 5:
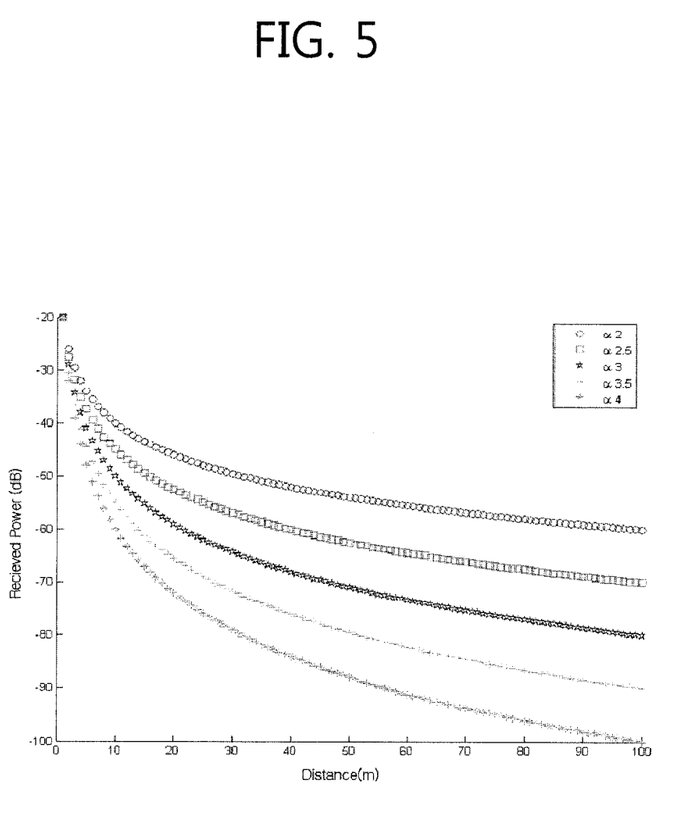
FIG. 5 is a graph showing the relationship between an RSS and the range between MPs and an AP on the basis of various values of a signal power attenuation factor.

FIG. 5 is a graph showing the relationship between the received signal strength RSS and the range between the MP and the AP on the basis of various signal power attenuation factors $\alpha$. From FIG. 5, it can be seen that the received signal strength RSS according to the distance is abruptly changed according to the various values.

An accurate signal power attenuation factor $\alpha$ may not be easily calculated according to a non-line of sight (NLOS) propagation environment and various dynamic environment factors. As can be seen from FIG. 5, however, a calculated range between the MP and the AP is changed several tens of meters even though the signal power attenuation factor $\alpha$ is slightly changed.

Figure 6:
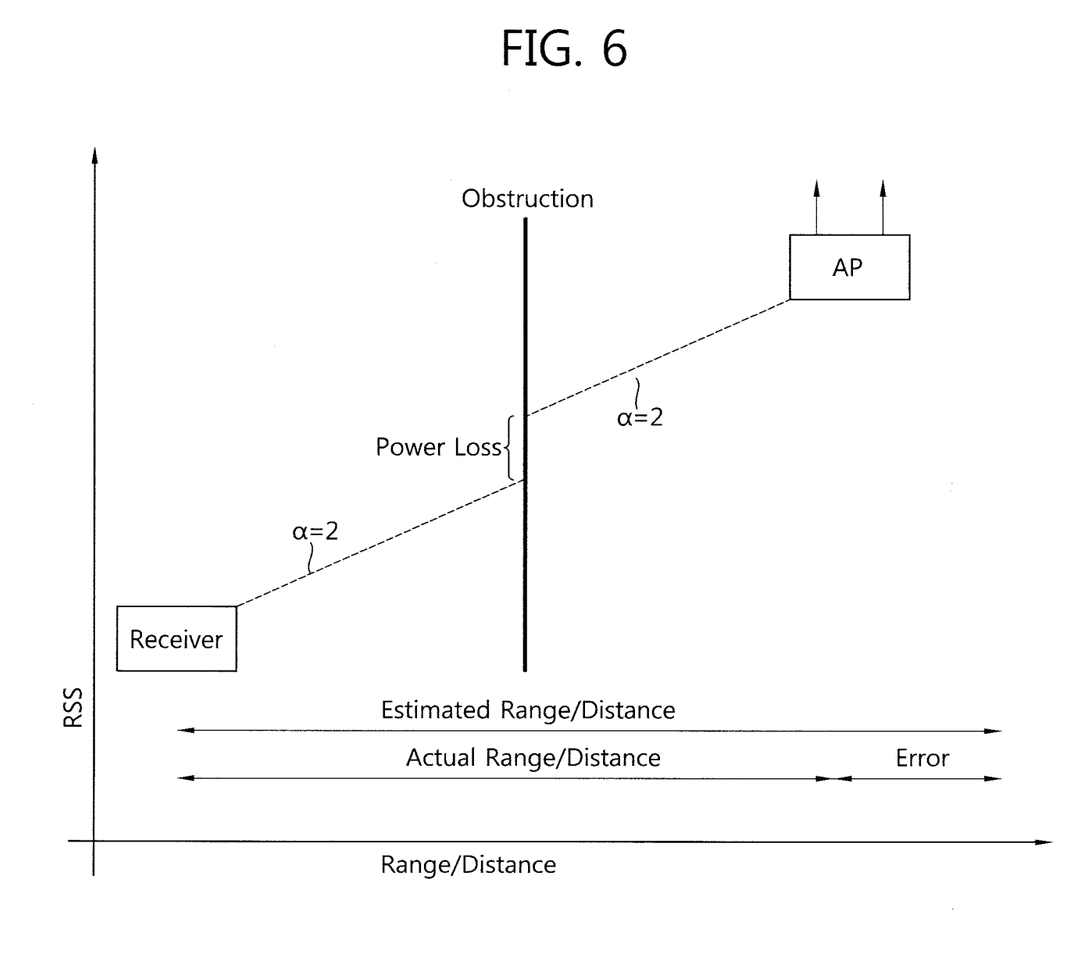
FIG. 6 shows a case where errors are generated in estimating the range between an MP and an AP because the transmission of a signal is hindered by an NLOS propagation environment.

FIG. 6 shows a case where errors are generated in estimating the range between a receiver MP and an AP because the transmission of a signal is hindered by an NLOS propagation environment. An actual signal power attenuation factor $\alpha$ is 2, but the range between the AP and the receiver MP is measured as being longer than an actual distance because of obstacles between the AP and the receiver MP.

Accordingly, in the present invention, in order to accurately calculate the range between the MP and the AP, there is suggested a method of using an imaginary signal power attenuation factor $\alpha$ in the NLOS propagation environment. The imaginary signal power attenuation factor $\alpha$ has a value different from an actual signal power attenuation factor $\alpha$, but if the imaginary signal power attenuation factor $\alpha$ is used, errors in calculating the range between the MP and the AP in the NLOS propagation environment can be minimized. The concept of the imaginary signal power attenuation factor $\alpha$ is based on a principle that a signal propagated in the NLOS propagation environment may depend on a specific signal power attenuation factor α for correcting the range between the MP and the AP and so the strength of the signal may be calculated with the least error.

Figure 7:
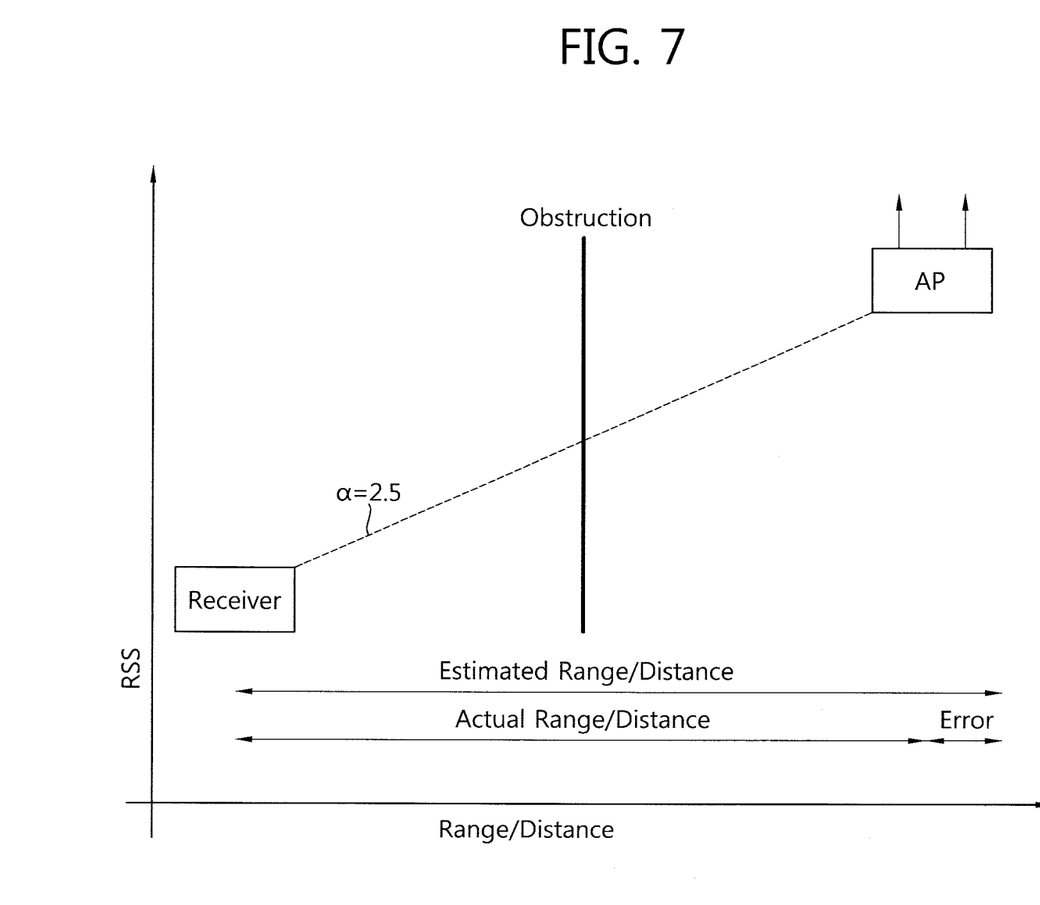
FIG. 7 shows a case where errors in estimating the range between an MP and an AP are minimized by using an imaginary signal power attenuation factor α in an NLOS propagation environment.

FIG. 7 shows a case where errors in estimating the range between an MP and an AP are minimized by using the imaginary signal power attenuation factor α in the NLOS propagation environment. From FIG. 7, it can be seen that the imaginary signal power attenuation factor α is set to 2.5 and errors in estimating the range between the MP and the AP are minimized as compared with FIG. 6.

It is assumed that four MPs exist on the roadside near an AP $AP_a$, for convenience of description. Received signal strengths RSS are measured in the respective MPs and aligned in descending powers. The measured received signal strength RSS of the MPs become the input to an algorithm to be described later. Equation 3 represents the received signal strengths RSS measured in the four MPs in terms of vector. A received signal strength $RSS_{a1}$ indicates the greatest received signal strength RSS from among the measured received signal strengths RSS, and a received signal strength $RSS_{a4}$ indicates the smallest received signal strength RSS from among the measured received signal strengths RSS.

$$RSS_{ai}=[RSS_{a1}\ RSS_{a2}\ RSS_{a3}\ RSS_4]\qquad\text{[Equation 3]}$$

Figure 8:
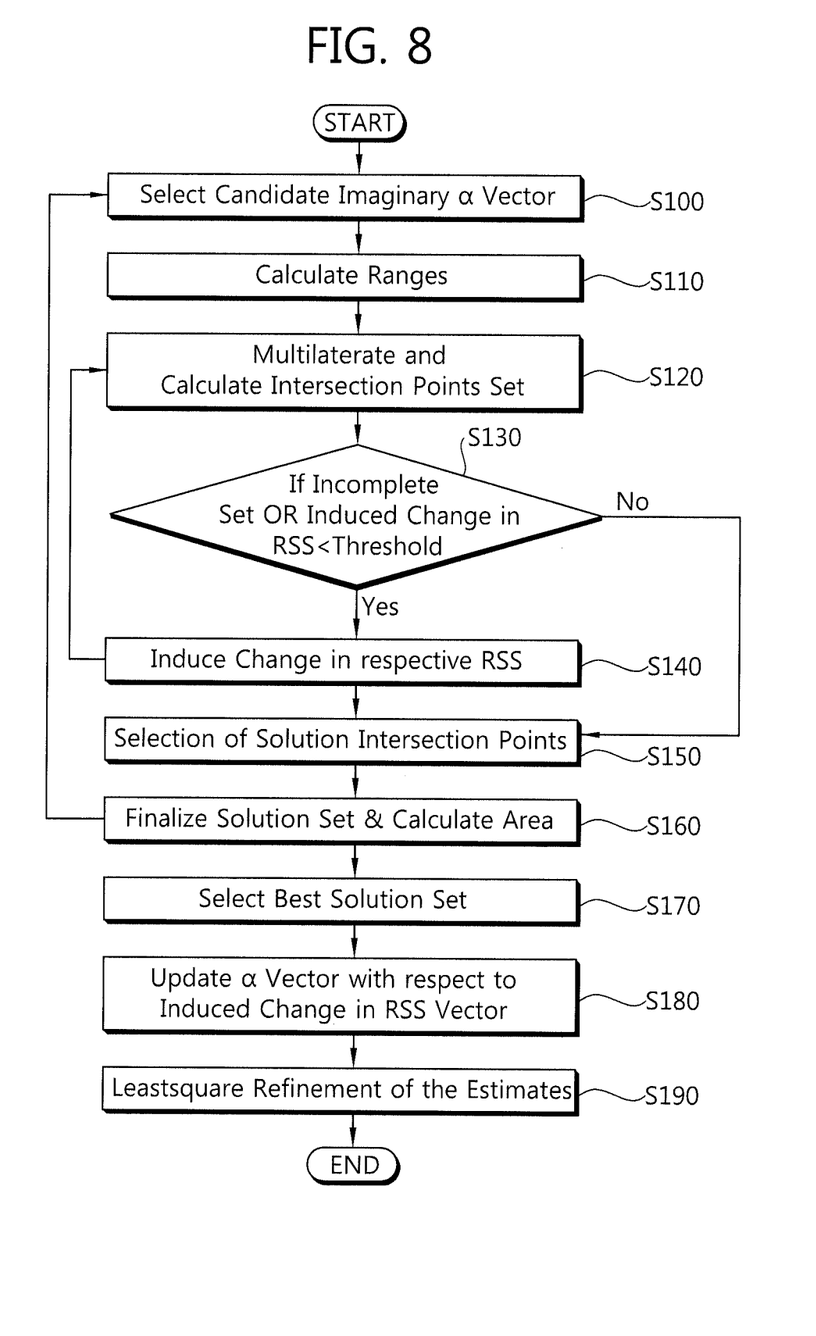
FIG. 8 shows an embodiment of the suggested method of estimating the position of an AP.

FIG. 8 shows an embodiment of the suggested method of estimating the position of an AP.

At step S100, an imaginary signal power attenuation factor α is selected.

Before the imaginary signal power attenuation factor α is selected, a set of selectable imaginary signal power attenuation factors α may be set up. The set of imaginary signal power attenuation factors α may include values arranged at the interval of 0.1 from 2 to 6. That is, the set of imaginary signal power attenuation factors α is [2.0, 2.1, 2.2, . . . , 6.0].

The imaginary signal power attenuation factor α is selected from the set of imaginary signal power attenuation factors α. A vector in which the number of elements is equal to the number of MPs may be formed using the selected imaginary signal power attenuation factor α. Equation 4 shows an example of the vector formed using the imaginary signal power attenuation factor α.

$$\alpha_i=[\alpha_1\ \alpha_2\ \alpha_3\ \alpha_4]\qquad\text{[Equation 4]}$$

The MP is placed in a relatively open space under the PLOS condition from among the above requirements of the MP. Accordingly, it may be assumed that there is no obstacle near each MP and $\alpha_i$ in each MP of Equation 4 has the same value.

At step S110, the range between the AP and each of the four MPs and is calculated.

The range between the MPs and the AP may be calculated using Equation 2. In Equation 2, $\alpha_i$ in each MP may be substituted into the selected imaginary signal power attenuation factor α, and the received signal strength $RSS_{ai}$ measured in the MP may be substituted into the received signal strength RSS. The reception sensitivity $P_0$ may be −20 dBm, but may be changed while the received signal strength RSS is experimentally measured when a handheld receiver MP is placed at the standard distance. Equation 5 shows an example of a distance vector formed on the basis of the range between the MPs and the AP. $d_{ai}$ indicates the range between the AP $AP_a$ and the MP $MP_i$.

$$d_{ai}=[d_{a1}\ d_{a2}\ d_{a3}\ d_{a4}]\qquad\text{[Equation 5]}$$

At step S120, a set of intersecting points is calculated using the multi-lateration method. The range $d_{ai}$ between the AP $AP_a$ and the MP $MP_i$, calculated at step S110, may be used to draw a circle around the position of the MP $MP_i$. Accordingly, a circle vector may be formed as in Equation 6.

$$\text{Circles}=[C_1\ C_2\ C_3\ C_4]\qquad\text{[Equation 6]}$$

The vectors of the measured received signal strengths $RSS_{ai}$ have been aligned and formed in descending powers and the range between the AP and each MP has been calculated using the same imaginary signal power attenuation factor $\alpha_i$ and the reception sensitivity $P_0$ in each MP. Accordingly, the size of a circle around the position of each MP is aligned within the circle vector. That is, the radius of $C_1$ is the shortest, and the radius of $C_4$ is the longest.

The circles drawn according to the multi-lateration method are paired on the basis of the smallest circle $C_1$. That is, it may be represented by Equation 7 below.

$$\text{CirclePair}=[C_1,C_2\ C_1,C_3\ C_1,C_4]\qquad\text{[Equation 7]}$$

An intersecting point is calculated for each pair. Each of the pairs may have 0 to two intersecting points. When two circles meet, two intersecting points are generated. When two circles are adjacent to each other, one intersecting point is generated. When one circle is placed within the other circle or two circles are separated from each other, the number of intersecting points is 0.

In case where each pair has two intersecting points, an intersecting point vector IPs may be generated as in Equation 8 below.

$$IP_s = \begin{bmatrix} IP_{(C_1,C_2)} & IP_{(C_1,C_2)} \\ IP_{(C_1,C_3)} & IP_{(C_1,C_3)} \\ IP_{(C_1,C_4)} & IP_{(C_1,C_4)} \end{bmatrix}\qquad\text{[Equation 8]}$$

Meanwhile, one or zero intersecting point may be generated in at least one pair because of error of the selected imaginary signal power attenuation factor $\alpha_i$ or errors of the measured received signal strength $RSS_{ai}$. In this case, the IPs vector may not be fully formed.

Figure 9:
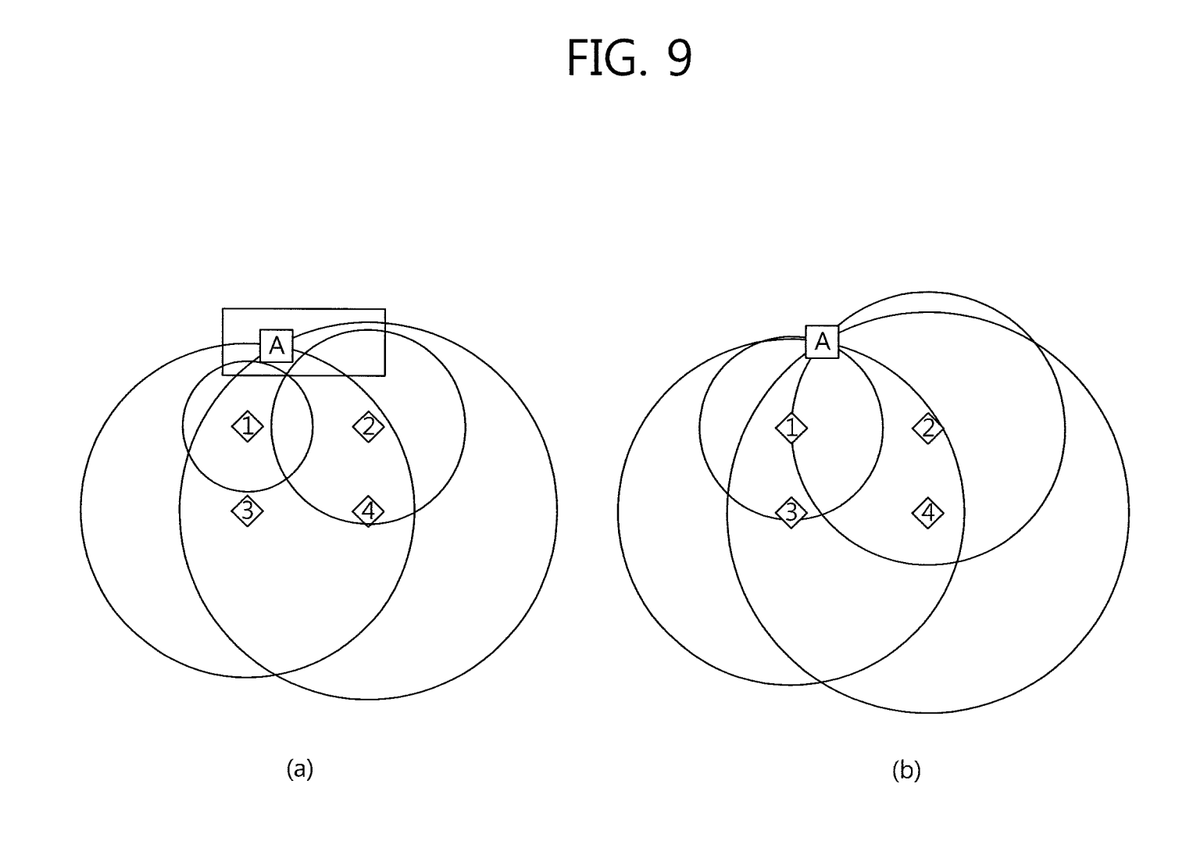
FIG. 9 shows a case where an incomplete intersecting point is formed because two circles are included within one circle.

FIG. 9 shows a case where an incomplete n intersecting point is formed because two circles are included within one circle. In (a) of FIG. 9, an intersecting point where all the four circles meet together is not formed because two circles are included within one circle. In (b) of FIG. 9, however, an intersecting point where all the four circles meet together is formed. In order to form a complete intersecting point between circles, the measured received signal strength $RSS_{ai}$ may be changed. The degree that the measured received signal strength $RSS_{ai}$ is changed is limited by a specific threshold value. The threshold value may be a specific value which may be obtained from the standard deviation of the received signal strength RSS measured at a specific MP.

That is, it is determined whether an incomplete intersecting point vector IPs has been formed or a change of the received signal strength RSS to be induced is smaller than the threshold value at step S130. If, as a result of the determination, an incomplete intersecting point vector IPs is determined to have been formed or a change of the received signal strength RSS to be induced is smaller than the threshold value, the measured received signal strength $RSS_{ai}$ is changed at step S140. The measured received signal strength $RSS_{ai}$ may be changed according to Equation 9.

$$RSS_{ai}'=RSS_{ai}+\Delta RSS_{ai}\qquad\text{[Equation 9]}$$

The measured received signal strength $RSS_{ai}$ is changed, and the intersecting point is iteratively calculated according to the multi-lateration method of step S120. The calculation of the intersecting point at step S120 is repeated until all the pairs have two intersecting points or a change of the measured received signal strength $RSS_{ai}$ exceeds the threshold value.

Solution intersecting points (IP) are selected from among the intersecting points calculated at step S150. The solution IP indicates a point where the intersecting points of each pair meet or a place where the intersecting points of each pair are gathered. In order to select the solution IP, a cumulative distance sorting technique may be used. The distances between all the intersecting points are calculated and aligned in ascending powers, and the position of each intersecting point is repositioned according to an aligned index. First three intersecting points are selected from among the repositioned intersecting point vectors IPs. Equation 10 represents the selected solution IP vector.

$$SolutionIP_s = \begin{bmatrix} IP_{(C_1,C_2)} \\ IP_{(C_1,C_3)} \\ IP_{(C_1,C_4)} \end{bmatrix}$$ [Equation 10]

At step S160, the selection of the solution IP is finalized, and an area is calculated. If the solution IPs selected at step S150 are generated within the perimeter of the MPs, the corresponding intersecting points are disregarded. However, if the solution IPs selected at step S150 are not generated within the perimeter of the MPs, an area surrounded by the solution IPs is calculated, thereby finalizing the selection of the solution IP. The selected solution IP may be completed as in Equation 11.

$$Solution(\alpha)=[SolutionIP_s, \Delta RSS_{ai}, \text{area } d_{ai}]$$ [Equation 11]

The steps S100 to S160 are repeated assuming that a value within the set of imaginary signal power attenuation factors α is set to the imaginary signal power attenuation factor α.

At step S170, the best solution is selected from among all solutions found for the given imaginary signal power attenuation factor α. The best solution may be selected according to the following criteria.

1) To minimize the size of an area surrounded by the intersecting points within the solution IP vector
2) To minimize the value of $\Delta RSS_{ai}$ (that is, a change of the measured received signal strength $RSS_{ai}$)
3) To maximize the number of intersecting points within the solution IP vector A solution to satisfy the above criteria, from among all the found solutions found for the given imaginary signal power attenuation factor α, is selected as the best solution.

At step S180, the imaginary signal power attenuation factor α is updated on the basis of a changed received signal strength $RSS_{ai}$. That is, in case where the change $\Delta RSS_{ai}$ of the measured received signal strength $RSS_{ai}$ is not 0, a corresponding imaginary signal power attenuation factor $\alpha_i$ is updated according to the best solution. The imaginary signal power attenuation factor $\alpha_i$ may be updated according to Equation 12.

$$\alpha_i = \left( \frac{\left( \frac{P_{a0} - RSS_{ai}}{10} \right)}{\log 10(d_{ai})} \right)$$ [Equation 12]

At step S190, the estimates are refined according to an iterative least-square (LS) algorithm to be described below. The estimated position of the AP may be indicated by x-axis coordinates $AP_{ax}$ and y-axis coordinates $AP_{ay}$. The iterative LS algorithm is described below.

1) An estimated value $\hat{P_0}$ of the reception sensitivity $P_0$ is calculated on the basis of the received signal strength RSS according to Equation 13.

$$\hat{P}_o = RSS_{ai} + 10 \cdot \alpha_i \cdot \log_{10}(d_{ai})$$ [Equation 13]

2) An estimated value $\widehat{RSS_{ai}}$ of the measured received signal strength $RSS_{ai}$ is calculated using the estimated values $\hat{P_0}$ according to Equation 14.

$$\hat{RSS}_{ai} = \hat{P}_o - 10 \cdot \alpha_i \cdot \log_{10}(d_{ai})$$ [Equation 14]

3) A z matrix is calculated according to Equation 15.

$$z = [\hat{RSS}_{ai} - RSS_{ai}]$$ [Equation 15]

4) An H matrix is calculated according to Equation 16.

$$H = \left[ -\frac{10 \cdot \alpha_i \cdot (AP_{ax} - MP_{ix})}{(\log_{10} d_{ai})^2} - \frac{10 \cdot \alpha_i \cdot (AP_{ay} - MP_{iy})}{(\log_{10} d_{ai})^2} 1 \right]$$ [Equation 16]

5) A delta matrix is calculated according to Equation 17.

$$\delta = [\Delta x \, \Delta y \, \Delta P] = (H' \cdot H) \cdot H' \cdot z$$ [Equation 17]

6) The estimated values are updated according to Equation 18.

$$AP_{ax} = AP_{ax} - \Delta x$$

$$AP_{ay} = AP_{ay} - \Delta y$$

$$\hat{P}_o = \hat{P}_o + \Delta P$$ [Equation 18]

7) The processes 2) to 6) are repeated until the condition of Equation 19 is satisfied.

$$|\hat{P}_o - P_{ao}| < 1$$ [Equation 19]

As described above, the position of an AP is estimated using an imaginary attenuation factor according to the multilateration method. Accordingly, the position of the AP can be accurately estimated with a small number of MPs.

While the invention has been shown and described with respect to the preferred embodiments, it will be understood by those skilled in the art that various changes and modifications may be made without departing from the spirit and scope of the invention as defined in the following claims.

The present invention can be implemented using hardware, software, or a combination of them. In the hardware implementations, the present invention can be implemented using an Application Specific Integrated Circuit (ASIC), a Digital Signal Processor (DSP), a Programmable Logic Device (PLD), a Field Programmable Gate Array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of estimating a position of an access point (AP) in a Wi-Fi system, the method comprising:
   measuring a strength of a signal, transmitted by the AP, at three or more measurement points (MPs);
   selecting an imaginary attenuation factor;
   calculating a range between the AP and each of the MPs based on the imaginary attenuation factor and a strength of a signal measured at each of the MP;
   calculating an intersecting point of ranging circles in each of which a position of the MP is a center and the range between the MP and the AP is a radius;
   calculating a best intersecting point from among a plurality of the intersecting points obtained by repeating the calculating the range and the calculating the intersecting point of ranging circles while changing the imaginary attenuation factor; and
   estimating the best intersecting point as the position of the AP.

2. The method of claim 1, wherein the imaginary attenuation factor is changed at an interval of 0.1 between 2 to 6.

3. The method of claim 1, wherein in the calculating the range, the range between the MP and the AP is calculated according to Equation below:

$$d_{ai} = d_o 10^{\left(\frac{P_o - RSS_{ai}}{10 \times \alpha}\right)}$$

wherein $d_0$ is a standard distance, $P_0$ is a nominal signal strength of the AP, $\alpha$ is an imaginary attenuation factor, and $RSS_{ai}$ is an average value of the strength of the signal.

4. The method of claim 1, wherein in the calculating the intersecting point of ranging circles, a number of the intersecting points of the ranging circles is 2.

5. The method of claim 4, further comprising determining whether a number of intersecting points of the ranging circles is 2 and a change of the strength of the signal is smaller than a specific threshold value.

6. The method of claim 5, further comprising changing the strength of the signal by the change, if, as a result of the determination, the number of intersecting points of the ranging circles is not 2 and the change of the strength of the signal is smaller than the specific threshold value.

7. The method of claim 1, wherein in the estimating, the position of the AP is estimated using an iterative Least-Square (LS) algorithm.

8. An apparatus for estimating a position of an AP in a Wi-Fi system, the apparatus comprising:
   a Radio Frequency (RF) unit configured to transmit or receive a radio signal; and
   a processor, coupled to the RF unit, and configured to:
   measure a strength of a signal, transmitted by the AP, at three or more MPs,
   select an imaginary attenuation factor,
   calculate a range between the AP and each of the MPs based on the selected imaginary attenuation factor and the strength of the signal measured at each of the MP,
   calculating an intersecting point of ranging circles in each of which a position of the MP is a center and the range between the MP and the AP is a radius; and
   estimate a best intersecting point, from among the calculated intersection points, as the position of the AP.

9. The apparatus of claim 8, wherein the imaginary attenuation factor is changed at an interval of 0.1 between 2 to 6.

10. The apparatus of claim 8, wherein the range between the MP and the AP is calculated according to Equation below:

$$d_{ai} = d_o 10^{\left(\frac{P_o - RSS_{ai}}{10 \times \alpha}\right)}$$

wherein $d_0$ is a standard distance, $P_0$ is a nominal signal strength of the AP, $\alpha$ is an imaginary attenuation factor, and $RSS_{ai}$ is an average value of the strength of the signal.

11. The apparatus of claim 8, wherein a number of the intersecting points of the ranging circles is 2.

12. The apparatus of claim 11, wherein the processor is further configured to determine whether a number of the intersecting points of the ranging circles is 2 and a change of the strength of the signal is smaller than a specific threshold value.

13. The apparatus of claim 12, wherein the processor is further configured to change the strength of the signal by the change, if, as a result of the determination, the number of intersecting points of the ranging circles is not 2 and the change of the strength of the signal is smaller than the specific threshold value.

14. The apparatus of claim 8, wherein the position of the AP is estimated using an iterative LS algorithm.

* * * * *